US008589633B2

(12) United States Patent
Ogasawara

(10) Patent No.: US 8,589,633 B2
(45) Date of Patent: Nov. 19, 2013

(54) CONTROL APPARATUS

(75) Inventor: Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 12/606,242

(22) Filed: Oct. 27, 2009

(65) Prior Publication Data

US 2010/0106932 A1  Apr. 29, 2010

(30) Foreign Application Priority Data

Oct. 27, 2008  (JP) .................................. 2008-275916

(51) Int. Cl.
*G06F 12/00* (2006.01)
(52) U.S. Cl.
USPC ............................. 711/147; 711/148; 711/154
(58) Field of Classification Search
None
See application file for complete search history.

(56) References Cited

U.S. PATENT DOCUMENTS 6,108,754 A * 8/2000 Lindholm ..................... 711/122

FOREIGN PATENT DOCUMENTS

| JP | 57168339(A) | 10/1982 |
|----|-------------|---------|
| JP | 01-303527 A | 12/1989 |
| JP | 7152589(A) | 6/1995 |
| JP | 11-120013 A | 4/1999 |
| JP | 2004-227434 A | 8/2004 |
| JP | 2005-063374 A | 3/2005 |
| JP | 2006-350741 A | 12/2006 |

OTHER PUBLICATIONS

J. Shirasuna, "The Use of Partioning Technology on VLDB", IEICE Technical Report, the Institute of Electronics, Information and Communication Engineers.

* cited by examiner

*Primary Examiner* — Matthew Bradley
*Assistant Examiner* — Alan Otto
(74) *Attorney, Agent, or Firm* — Cantor Colburn LLP; Dwayne Nelson

(57) ABSTRACT

A control apparatus, control method and computer readable article of manufacture for controlling data. The control apparatus includes a data storage unit; a plurality of entry storage units, and a plurality of registration units. The data storage unit stores data. Each of the entry storage units stores an entry for registering a pointer to data. If each of the registration units receives an instruction for registering data, then each registration unit (i) searches the entry storage units for an entry storage unit having an empty entry, (ii) registers a pointer to the data to be registered in the retrieved entry storage unit and (iii) stores the data to be registered and identification information of the retrieved entry storage unit in the data storage unit in such a manner that the data to be registered and the identification information is associated with each other.

17 Claims, 8 Drawing Sheets

FIG. 4

```
01: int d= D, i, pos=-1; boolean r=false;
02: Domain dom=null;
03: for (i=start; i<=d; i+=step) {
04:   do {
05:       dom = H[i];
06:       pos = dom.A.get();
07:       if (pos == -1) {
08:           pos = dom.G.get();
09:           if (pos == -1)
10:               break; // no free
11:           else
12:               r = dom.G.compareAndSet(pos, dom.E[pos]);
13:       } else {
14:           if (pos+1 < Domain.maxNum)
15:               r = dom.A.compareAndSet(pos, pos+1);
16:           else
17:               r = dom.A.compareAndSet(pos, -1);
18:       }
19:   } while (r == false); // continue atomic op until it is succeeded
20:   if (r == true)
21:       break; // empty slot found
22:   else
23:       // no free in i-th segment
24: } // end for
```

FIG. 5

```
01: public void remove(Entry conn) {
02:     int pos = conn.getSegmentOffset();
03:     Domain dom = H[conn.getSegmentIndex()];
04:     boolean r;
05:     do {
06:         AtomicInteger g = seg.G;
07:         int gval = g.get();
08:         dom.E[pos] = gval;
09:         dom.F[pos] = null;
10:         r = g.compareAndSet(gval,pos);
11:     } while (r != true);
12: }
```

FIG. 6

```
01: // no free. expand H
02: int new_d = d+step;
03: if (I.compareAndSet(d,new_d)) {
04:    if (new_d == sizeofH) {
05:       // RCU (Read-Copy Update)
06:       Domain tmp[] = new Domain[sizeofH*2];
07:       System.arraycopy(H, 0, tmp, 0, sizeofH);
08:       H = tmp;
09:       sizeofH *= 2;
10:    }
11:    for(int j=d+1; j<=new_d; j++) {
12:       H[j] = new Domain();
13:    }
14:    D.set(new_d);
15: }
```

CONTROL APPARATUS

CROSS-REFERENCE TO RELATED APPLICATIONS

This application claims priority under 35 U.S.C. §119 from Japanese Patent Application No. 2008-275916 filed Oct. 27, 2008, the entire contents of which are incorporated herein by reference.

BACKGROUND OF THE INVENTION

The present invention relates to a control apparatus, a control program, and a control method for controlling data.

With the recent widespread use of multi-thread CPUs or multi-core CPUs and recent increases in the number of CPUs included in a server, the number of hardware threads simultaneously executable on a server is increased. For example, even an entry server can realize 64 hardware threads. In order to centrally control data on a server, shared data accessible from each of multiple hardware threads is used.

If each thread simultaneously accesses the shared data using exclusive control, the integrity of the shared data is maintained. However, if the number of hardware threads is increased, exclusive control over the shared data performed by one hardware thread is apt to compete with that performed by other hardware threads. This causes a bottleneck. Specifically, other threads attempting to access the shared data must wait when one thread is performing exclusive control on the shared data. Also, an overhead for handling such a competition is increased.

Among examples of such an overhead are a CPU time consumed when one thread spin-waits until compare and swap succeeds and a processing time taken until a library or the OS generates a queue of threads. There has been proposed "non-blocking hash map" as a data structure that allows efficient control of shared data. Below are examples of a proposed non-blocking hash map data structure.

Cliff Click, "A Lock-Free Hash Table", [online], 2007-05-08, AZUL SYSTEMS, retrieved from the Internet on 2008-10-03, <URL: http://www.azulsystems.com/events/javaone_2007/2007_LockFreeHash.pdf>

Cliff Click, "A Lock-Free Wait-Free Hash Table", [online], 2007-02-21, Stanford University Computer Systems Laboratory EE380 Colloquium, retrieved from the Internet on 2008-10-03, <URL: http://www.stanford.edu/class/ee380/Abstracts/070221.html>

Cliff Click, "A Fast Lock-Free Hash Table", [online], 2007-02-21, JavaOne Online Technical Sessions, retrieved from the Internet on 2008-10-03, <URL: http://developers.sun.com/learning/javaoneonline/2007/pdf/TS-2862.pdf>

Among examples of the usage of shared data is registration of new data, deletion of the registered data, and listing of the registered data, each of which is performed by each of multiple threads. For example, if a server receives an access request from an external apparatus, the server registers information about the access request as shared data, deletes the information when the access is completed, and lists all the registered accesses so as to process the accesses. If an application is executed where a great number of hardware threads frequently register and/or delete data there is a need to realize high throughput and scalability with respect to the registration and/or deletion of data.

SUMMARY OF THE INVENTION

Accordingly, a first aspect of the present invention provides a control apparatus for controlling data. The control apparatus includes: a data storage unit for storing data; a plurality of entry storage units, each of the entry storage units storing an entry for registering a pointer to data; and a plurality of registration units wherein if each of the registration units receives an instruction for registering data, each registration unit searches the entry storage units for an entry storage unit having an empty entry and then register a pointer to the data to be registered, in the retrieved entry storage unit and stores the data to be registered and identification information of the retrieved entry storage unit in the data storage unit in such a manner that the data to be registered and the identification information is associated with each other. Also, the first aspect of the invention provides a control program and a control method.

A second aspect of the present invention provides a control apparatus for controlling data. The control apparatus includes: a plurality of entry storage units each including an entry for registering data; and a plurality of registration units wherein if each of the registration units receives an instruction for registering data, each registration unit searches the entry storage units in an order different from orders in which the other registration units search the entry storage units, and then registers data in one of the entry storage units, the one entry storage unit having an empty entry. Also, the second aspect of the invention provides a control program and a control method.

BRIEF DESCRIPTION OF THE DRAWINGS

FIG. 4 shows the flow of a data registration process performed by the information processing apparatus according to this embodiment.

FIG. 5 shows the flow of a data deletion process performed by the information processing apparatus according to this embodiment.

FIG. 6 shows the flow of a domain addition process performed by the information processing apparatus according to this embodiment.

DETAILED DESCRIPTION OF THE PREFERRED EMBODIMENTS

Figure 1:
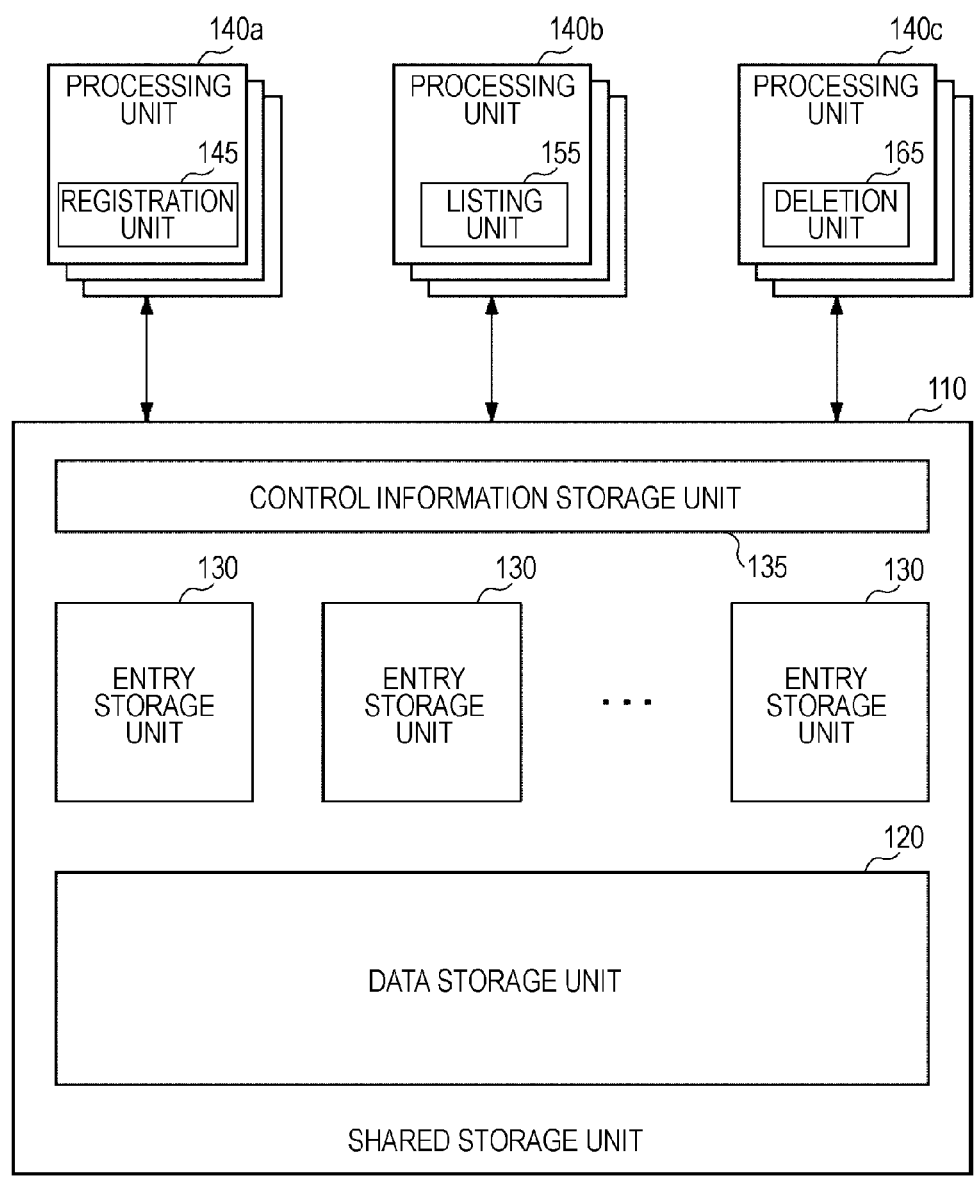
FIG. 1 shows a functional configuration of an information processing apparatus 100 according to an embodiment of the present invention.

FIG. 1 shows a functional configuration of an information processing apparatus 100 according to this embodiment. The information processing apparatus 100 is, for example, a server, a personal computer, a processor, or the like and the elements thereof are realized when software executed on the information processing apparatus 100 and hardware resources collaborate with each other. Alternatively, the information processing apparatus 100 may be a distributed system including multiple computers and a storage unit shared by the computers or may be an apparatus in which the functions of the elements are realized by hardware.

The information processing apparatus 100 includes a shared storage unit 110 for storing data and multiple processing units 140a, multiple processing units 140b, and multiple processing units 140c (hereafter collectively referred to as "processing units 140"), all of which perform information processing while sharing the data stored in the shared storage unit 110. The shared storage unit 110 includes a data storage unit 120 for storing data, multiple entry storage units 130 that each store an entry for registering a pointer to data, and a control information storage unit 135 for storing control information for controlling the entry storage units 130.

The multiple processing units 140 register data in the shared storage unit 110 and share the data. The processing units 140 perform processes assigned thereto while accessing the data registered in the shared storage unit 110. Each processing unit 140 may be realized by executing an assigned program, process, thread, or the like on one or more processor cores of a multi-core processor, one or more hardware threads of a multi-thread processor, or one or more processors of a parallel processor included in the information processing apparatus 100.

The multiple processing units 140a, which are at least a part of the multiple processing units 140, each include a registration unit 145 for registering data in the shared storage unit 110. The multiple processing units 140b, which are at least a part of the processing units 140, each include a listing unit 155 for listing pieces of data stored in the shared storage unit 110 and performing processes corresponding to the pieces of data. The multiple processing units 140c, which are at least a part of the processing units 140, each include a deletion unit 165 for deleting data stored in the shared storage unit 110, for example, if the data has been processed or has become unnecessary.

The above-mentioned registration units 145, listing units 155, and deletion units 165 may be provided in the form of a program library and may be called and started when accessing the shared data when a program is being executed on the processing units 140. The registration units 145, listing units 155, and deletion units 165, and shared storage unit 110 operate as apparatuses for providing functions such as the registration, listing, and deletion of the shared data to the processing units 140, that is, operate as control apparatuses for controlling the data. Each processing unit 140 may include any combination of the registration unit 145, listing unit 155, and deletion unit 165 in accordance with a process assigned to the processing unit 140 and may perform any combination of the registration, listing, and deletion of data using these elements.

By adopting the information processing apparatus 100 as described above, the multiple registration units 145 included in the multiple processing units 140a access the multiple entry storage units 130 in a distributed manner so as to register pieces of data. As a result, higher throughput and scalability with respect to the registration of data is obtained. Also, the multiple deletion units 165 included in the multiple processing units 140c access the multiple entry storage units 130 in a distributed manner so as to delete pieces of data. As a result, higher throughput and scalability with respect to the deletion of data is also obtained.

Figure 2:
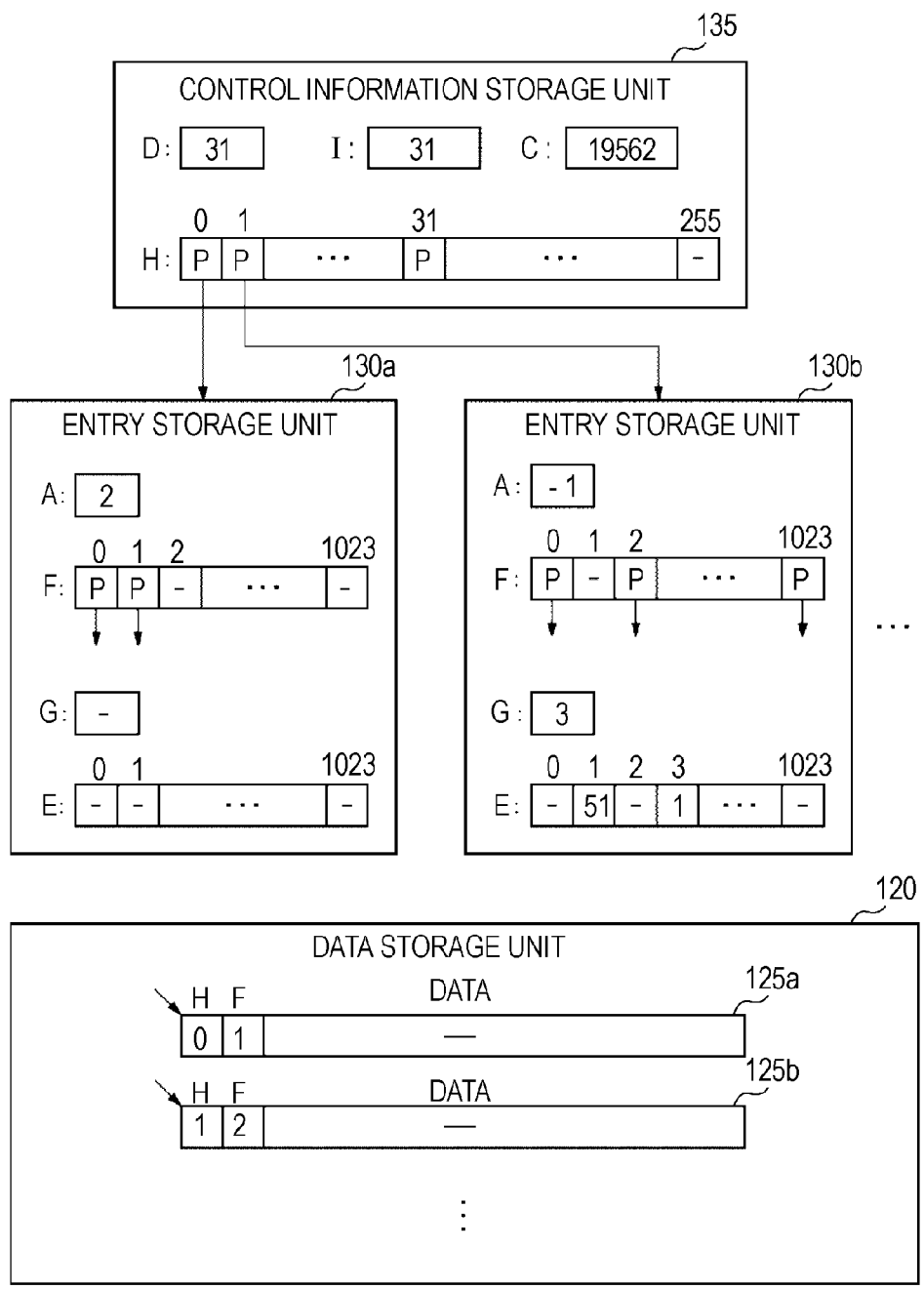
FIG. 2 shows a configuration of a shared storage unit according to this embodiment.

FIG. 2 shows a configuration of the shared storage unit 110 according to this embodiment. The control information storage unit 135 is for storing control information and the like used when controlling the multiple entry storage units 130 and a spare entry storage unit 130. In this embodiment, the control information storage unit 135 is storing a variable D, a variable I, a variable C, and an array H.

The variable D is a domain number counter and is storing the largest value of the domain number (0, 1, ... ). In this case, domains correspond to the entry storage units 130 in which pieces of the shared data are registered in a distributed manner. In this embodiment, domains identical in number to thirty-two registration units 145 are prepared. The domain number counter may indicate other types of value, such as the number of domains (e.g., 32), rather than the largest value of the domain number.

The variable I is an atomicity guarantee counter and is used when any of the registration units 145 increases the total number of domains. The variable C is a change counter and is atomically updated each time data is registered or deleted in or from any of the entry storage units 130. The usage of the variables I and C will be described in detail with reference to FIGS. 6 and 7.

The array H stores pointers to the multiple entry storage units 130. In this embodiment, using domain numbers as indexes, the array H is storing pointers to entry storage units 130 identified by corresponding domain numbers or identification information of each of the entry storage units 130. Also, the array H may include at least one spare pointer in preparation for a case where a spare entry storage unit 130, which is not in use currently, is used later. In this embodiment, the array H has indexes corresponding to 256 domains having domain numbers 0 to 255. Among these domains, 32 domains having domain numbers 0 to 31 are in use and 224 domains having domain numbers 32 to 255 are spare domains.

The multiple entry storage units 130 each store a variable A, an array F, a variable G, and an array E. The array F is a group of registration control slots and includes one or more entries (also referred to as "slots") for registering a pointer to data. Each entry of the array F is storing a pointer to data or a null value (e.g., "−1"; shown in the form of "−" in FIG. 2) indicating that no pointer to data is registered in that entry. In this embodiment, the array F includes, for example, 1024 slots having entry numbers 0 to 1023.

The variable A is the index of the top of unused registration control slots. If data is registered sequentially in the multiple entries included in the array F starting with the top entry, the variable A stores identification information for identifying the top unused entry. For example, if data is registered sequentially in the multiple entries included in the array F starting with the top entry, the variable A stores the entry number (that is, the smallest index value) of the top one of entries where data is unregistered. Hereafter, an entry usage in which one or more registration units 145 start registering data in the array F with the domains thereof being blank and continue registering data sequentially therein until the whole array F is consumed so that the value of the variable A overflows the largest slot number will be referred to as "linear use."

The array E is a registration-cancelled control structure of registration control slots and is storing a list of unused entries. Specifically, the array E links slots of the array F that have become empty due to the deletion of data caused when the array F is linearly being used or after the use. Entries of the arrays E and F at the same index are a pair, and an entry of array E is the index of an empty entry next to a corresponding entry in the array F. In the array E, null values meaning invalid values are set for elements corresponding to entries in use in the array F. A null value is also set for an entry corresponding to an empty entry that has no subsequent empty entry in the array F.

The variable G indicates the index of the top one of registration-cancelled registration control slots, that is, the index (i.e., entry number) of the top entry in the list of unused entries stored in the array E. For example, in an entry storage unit 130*b* shown in FIG. 2, the variable G indicates that the top entry in the list of unused entries is entry number 3. Incidentally, entry number 1 that is the entry number of the subsequent unused entry is stored at index 3 of the array E specified by the variable G. Also, entry number 51 that is the entry number of the subsequent unused entry is stored at index 1 of the array E. That is, the entry storage unit 130*b* shown in FIG. 2 is storing entry numbers {3, 1, 51, . . . } of the array F as the list of unused entries.

The data storage unit 120 is storing the substance of data registered in the array F. In this embodiment, the data storage unit 120 is storing target data 125*a* and target data 125*b*. In each target data 125 is registered data ("DATA" in the data storage unit 120 of FIG. 2), identification information ("H" in the data storage unit 120 of FIG. 2) of an entry storage unit 130 where the data is registered, and identification information ("F" in the data storage unit 120 of FIG. 2) of an entry where the data is registered are associated with one another in storage positions designated by pointers registered in the array F. For example, the target data 125*a* is storing data registered in entry 1 (that is, index number 1 in the array F) of domain 0 (that is, index number 0 in the array H). The target data 125*b* is storing data registered in entry 2 (that is, index number 2 of the array F) of domain 1 (that is, index number 1 in the array H). The pieces of data stored in the target data 125*a* and target 125*b* may take any form such as numerical values, character strings, arrays, structures, objects, pointers, or pointers to these items in accordance with processes performed by the processing units 140.

The shared storage unit 110 according to this embodiment linearly uses the array F and controls unused entries using the array E. Alternatively, the shared storage unit 110 may adopt other data structures that allow addition and deletion of a pointer to data.

Figure 3:
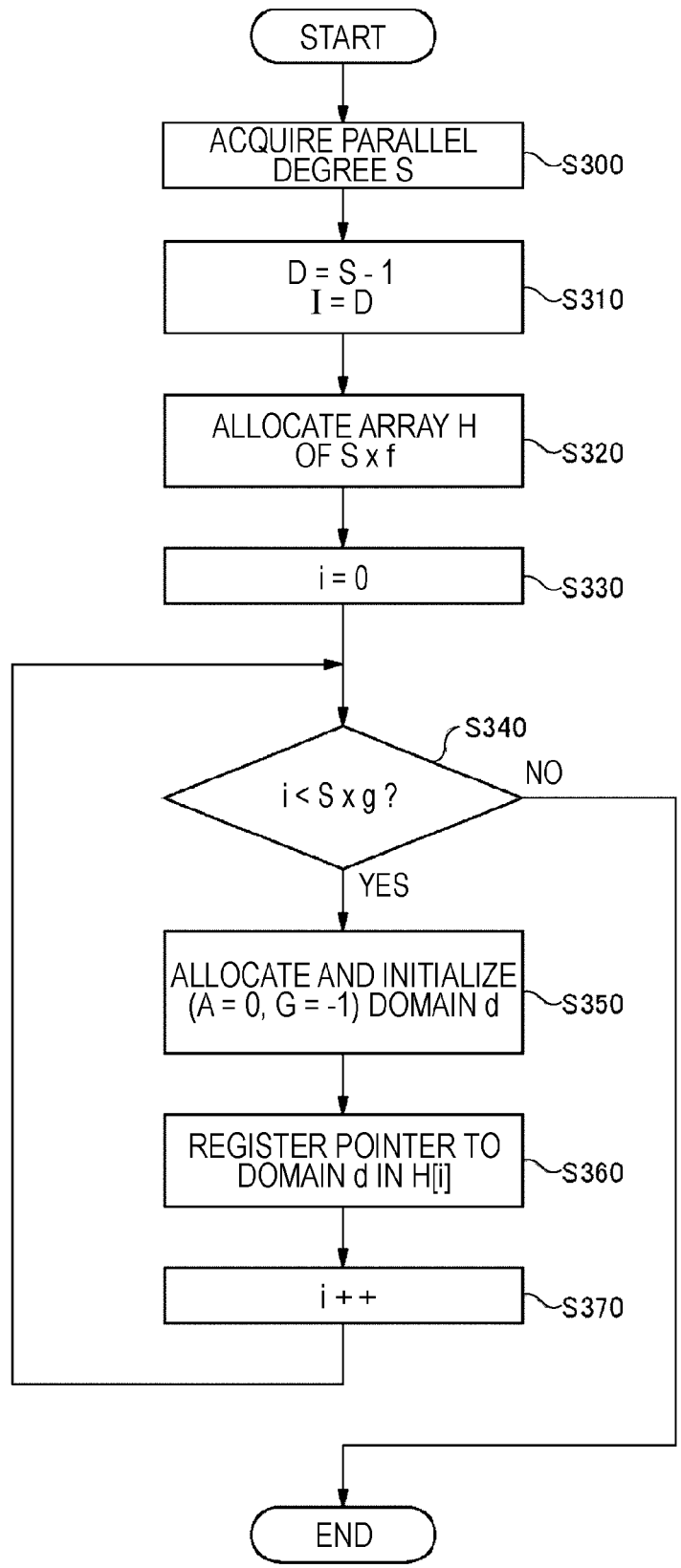
FIG. 3 shows the flow of an initialization process performed by the information processing apparatus according to this embodiment.

FIG. 3 shows the flow of an initialization process performed by the information processing apparatus 100 according to this embodiment. One registration unit 145 acquires a parallel degree S in order to perform the initialization process on the shared storage unit 110 (S300). In this case, the registration unit 145 may acquire, as the parallel degree S, the number of hardware threads simultaneously executable on the information processing apparatus 100. For example, the registration unit 145 may calculate, as the parallel degree S, "the number of processors×the number of processor cores per processor×the number of hardware threads per processor core" of the information processing apparatus 100. Alternatively, the processing units 140 may use, as the parallel degree S, the number of processing units 140 that each include the registration unit 145 and/or deletion unit 165.

Subsequently, the registration unit 145 sets the number of the domains in which pieces of the shared data are registered in a distributed manner for each of the variable D and variable I in the control information storage unit 135 (S310). In this embodiment, the registration unit 145 sets a parallel degree S-1 for the variable D of the control information storage unit 135 and sets the variable D for the variable I thereof. Thus, the registration unit 145 makes initially available domains identical in number to the parallel S. Alternatively, the registration unit 145 may make available domains different in number from the parallel degree S. Also, if the parallel degree S is not obtained, the registration unit 145 may make available a predetermined number of domains or the number of domains specified by an application or the like executed on the information processing apparatus 100.

Subsequently, the registration unit 145 allocates the array H having pointers identical in number to the number of domains obtained by adding the number of domains prepared as spares to the number of the initially available domains (S320). In this embodiment, the registration unit 145 prepares the array H having a size corresponding to the number of domains obtained by multiplying the parallel degree S by a predetermined positive integer f (f=1, 2, . . . ). In FIG. 2, for example, it is assumed that f=8. However, the registration unit 145 does not always need to prepare a spare domain.

Subsequently, the registration unit 145 initializes a loop variable i to zero (S330) for use in a loop process for preparing domains to be made initially available (S340). In this embodiment, the registration unit 145 makes initially available the number of domains obtained by multiplying the parallel degree S by a predetermined positive integer g (g=1, 2, . . . ). In FIG. 2, for example, it is assumed that g=1.

If loop variable i is less than parallel degree S×positive integer g, then the registration unit 145 allocates an entry storage unit 130 corresponding to each of the initially available domains in the shared storage unit 110 and sets zero for the variable A, an invalid value for the variable G, and invalid values for the respective elements of the arrays E and F (S350). Subsequently, the registration unit 145 registers a pointer of allocated domain d (that is, a pointer to an entry storage unit 130) as element H [i] (that is, the i-th element in the array H) (S360). The registration unit 145 repeats the loop process from S340 to S370 while incrementing the loop variable i (S370). When the registration unit 145 finishes preparing the domains to be made initially available, it completes the initialization process (NO in S340).

FIG. 4 shows an example of code in accordance with which the information processing apparatus 100 according to this embodiment performs a data registration process. If each registration unit 145 receives an instruction for registering data from a program running on the processing units 140 then each registration unit 145 searches the multiple entry storage units 130 for an entry storage unit 130 having an empty entry and registers a pointer to the data to be registered in the retrieved entry storage unit 130. Subsequently, as shown by the target data 125 of FIG. 2, each registration unit 145 stores (i) the data to be registered, (ii) identification information of the retrieved entry storage unit 130 in which the pointer has been registered, and (iii) identification information of an entry in which the pointer has been registered, in a storage position of the data storage unit 120 designated by the registered pointer in such a manner that the data and the pieces of identification information are associated with one another.

In this embodiment, each registration unit 145 increases the loop variable i from a value designated by variable start in increments of a value designated by variable step. While the value of the loop variable i is less than the number of available domains d (=D) (in the third row), each registration unit 145 searches an entry storage unit 130 designated by the loop variable i for an empty entry. If the entry storage unit 130 has an empty entry, each registration unit 145 performs a loop process for registering data (in the 4th to 23rd rows). In the loop process, each registration unit 145 reads out the value of the variable A of domain dom (=H[i]) designated by the loop variable i and stores the read-out value as variable pos meaning an entry that is a candidate for the registration destination (in the 5th to 6th rows). If the variable pos (=variable A) is a null value (=-1), each registration unit 145 determines that the whole array F has been used linearly (in the 7th row). Subsequently, each registration unit 145 reads out the value of the variable G and stores the read-out value as the variable pos. Thus, each registration unit 145 acquires the index of the top entry in the list of unused entries stored in the array E (in the 8th row).

If the variable pos (=variable G) is a null value, each registration unit 145 determines that there is no unused entry, and completes the inspection of the domain (in the 10th row). In contrast, if the variable pos is not a null value, each registration unit 145 writes the index of the subsequent empty entry stored at an index designated by the variable pos in the array E, into the variable G (in the 12th row). Specifically, if the variable G is identical to a value obtained in the 8th row, each registration unit 145 executes a compare-and-set command for replacing the value of the variable G with the index of the subsequent empty entry.

On the other hand, if the variable pos (=variable A) is not a null value in the 7th row, each registration unit 145 atomically updates identification information of the top unregistered entry by atomically incrementing the variable A (in the 15th row). However, if the largest value of the domain number is exceeded by incrementing the variable A, each registration unit 145 sets a null value for the variable A (in the 14th, 16th, and 17th rows) and finishes using the array F linearly.

Each registration unit 145 repeatedly attempts the process written in the 5th to 19th rows until the atomic change of the variable G or A shown in the 12th, 15th, or 17th row succeeds (in the 19th row). If the atomic change of the variable G or A succeeds, each registration unit 145 registers a pointer to the data in an empty entry stored as the variable pos in the process in the 25th and later rows. Specifically, each registration unit 145 writes a pointer to the target data 125 into an empty entry in the array F, as well as writes the target data 125 into the data storage unit 120.

On the other hand, if the domain has no empty entry, each registration unit 145 repeats the above-mentioned loop process (in the 3rd and 24th rows). If an entry storage unit 130 having an empty entry cannot be detected, each registration unit 145 may call an additional domain process shown in FIG. 6. Alternatively, each registration unit 145 may perform a registration process again while searching a set of other entry storage units 130 obtained by setting different values for the variable start and/or variable step. For example, each registration unit 145 may perform a registration process again while inspecting all the entry storage units 130 by setting 0 for the variable start and 1 for the variable step.

By performing the above-mentioned data registration process, if the two or more registration units 145 each receive an instruction for registering data, each registration unit 145 searches a set of at least two or more entry storage units 130 different from sets of at least two or more entry storage units 130 searched by the other registration units 145 among the multiple entry storage units 130, for an entry storage unit 130 having an empty entry. For example, assume that there are 32 registration units 145 and that (start=0, step=4) is set for eight registration units 145, (start=1, step=4) is set for another eight registration units 145, (start=2, step=4) is set for yet another eight registration units 145, and (start=3, step=4) is set for the remaining eight registration units 145. In this case, if the above-mentioned data registration process is performed, registration units 145 to which an identical start value has been set search a set of at least two or more entry storage units 130 different from sets of at least two or more entry storage units 130 searched by the other registration units 145 to which different start values have been set, for an entry storage unit 130 having an empty entry. Also, each registration unit 145 obtains an empty entry by performing an atomic process on the variable A or G very few times (once in FIG. 4). As is understood from the above description, the information processing apparatus 100 allows the multiple registration units 145 to perform registration processes on the multiple entry storage units 130 in a distributed manner, as well as allows minimizing the frequency of an atomic process performed on each entry storage unit 130. This reduces the frequency of occurrence of a competition.

Various methods can be realized as examples of a method by which two or more registration unit 145 each search a set of entry storage units 130 different from sets of entry storage units 130 searched by the other registration units 145, for an entry storage unit 130 having an empty entry. For example, as described above, each of the multiple registration units 145 or each of groups of registration units 145 obtained by dividing the multiple registration units 145 may be assigned a set of two or more entry storage units 130 different from sets of two or more entry storage units 130 searched by the other registration units 145 or the other groups. Alternatively, each registration unit 145 or each group of registration units 145 may be assigned at least one common entry storage unit 130 and entry storage units 130 different from those searched by the other registration units 145 or the other groups. For example, group 0 of registration units 145 may be assigned domains 0 to 23 and group 1 of registration units 145 may be assigned domains 16 to 31.

Also, if the two or more registration units 145 each receive an instruction for registering data, each registration unit 145 may search the multiple entry storage units 130 in different orders. This means if the two or more registration units 145 assigned different sets of entry storage units 130, the registration units 145 search the multiple entry storage units 130 in different orders. However, even if two or more registration units 145 each search a identical set of entry storage units 130, entry storage units 130 that are registration destinations are distributed by searching the entry storage units 130 in different orders. For example, the group 0 of registration units 145 may search entry storage units 130 in the order of [0, ..., 31] staring with domain 0 and the group 1 of registration units 145 may search entry storage units 130 in the order of [16, ..., 31, 0, ..., 15] staring with domain 16. Also, the group 1 may search entry storage units 130 in the order of [31, ..., 0], which is the reverse order, staring with domain 31.

In the above-mentioned process, each of the multiple registration units 145 may calculate or determine, from unique information unique to the registration unit 145, a set of entry storage units 130 to be assigned to the registration unit 145, the order in which the multiple entry storage units 130 are searched, or an entry storage unit 130 to be accessed first. Each registration unit 145 may use, as unique information unique to the registration unit 145, the process number and/or thread number of a program that operates as the registration unit 145 itself or a processing unit 140 for calling the registration unit 145 in the information processing apparatus 100, hash code, a predetermined value, or a value calculated by combining these numbers, code, and the like.

Alternatively, each registration unit 145 may acquire a value, such as a random number that varies each time the random number is read, or a value, such as a timer value that varies with the time when the timer value is read, from a random number generation unit, a timer unit, or the like provided inside or outside the information processing apparatus 100 when the registration unit 145 itself or processing unit 140 is performing an initialization process or each time a data registration process is performed, and may generate unique information from any one of these values, a value obtained by combining these values, or the like. In this case, the registration unit 145 may use the acquired value as unique information or may generate unique information corresponding to the acquired value by subjecting the acquired value or the like to a known conversion such as obtaining of the remainder using (largest value of unique information+1) or the like.

Also, if each registration unit 145 receives an instruction for registering data, each registration unit 145 may retrieve an entry storage units 130 having an empty entry from sets of at least two or more entry storage units 130 in each of which a quotient or the remainder obtained by dividing the value of identification information of the entry storage unit 130 by the number of entry storage units 130 (i.e., parallel degree S) (or the remainder obtained by dividing the quotient by the number of entry storage units 130) agrees to an quotient or the remainder obtained by dividing unique information unique to the registration unit 145 by the number of entry storage units 130 (or the remainder obtained by dividing the quotient by the number of entry storage units 130). For example, each registration unit 145 may use hash code as an example of an identifier uniquely determined with respect to a thread that operates as a processing unit 140 including the registration unit 145 or operates as the registration unit 145 itself and may use the remainder obtained by dividing this hash code by the parallel degree S, as the variable start. Specifically, each registration unit 145 may use, as method initialValue( ) for initializing the variable start, a method that expands the ThreadLocal class of Java (registered trademark) and includes "return new Integer(Thread.currentThread( )hashCode( )%S)".

FIG. 5 shows an example of code in accordance with which the information processing apparatus 100 according to this embodiment performs a data deletion process. If each deletion unit 165 receives an instruction for deleting registered data, from a program running on the processing units 140, each deletion unit 165 performs a data deletion process.

First, method remove is called and then each deletion unit 165 receives a pointer to the target data 125 to be deleted and perform a data deletion process (in the 1st row). Using the received pointer, each deletion unit 165 acquires, from the data storage unit 120, identification information conn.getSegmentOffset( )of an entry storage unit 130 in which the data is registered and identification information pos of an entry in which the pointer to the data is registered (in the 3rd and 2nd rows). Also, each deletion unit 165 acquires a pointer to the entry storage unit 130 by acquiring an index corresponding to the identification information of the entry storage unit 130 in the array H (in the 3rd row).

Subsequently, each deletion unit 165 adds the entry corresponding to the data to be deleted, to the top of the list of unused entries stored in the array E. Specifically, each deletion unit 165 reads out the index of the current top unused entry from the variable G and writes the index into the entry corresponding to the data to be deleted (in the 8th row). Also, by setting an invalid value for the entry corresponding to the data to be deleted in the array F, each deletion unit 165 deletes the data from the array F (in the 9th row). Then, each deletion unit 165 atomically writes the entry corresponding to the deleted data into the variable G as the index of the top unused entry (in the tenth row). By performing these processes, each deletion unit 165 deletes the pointer to the data to be deleted from the entry storage unit 130 specified by the identification information acquired from the target data 125, as well as atomically adds the entry of the array in which the data has been registered, to the list of unused entries.

Each deletion unit 165 performs a spin loop until it successfully performs atomic processes in the 6th to 10th rows. If each deletion unit 165 successfully performs the atomic processes, it completes the data deletion process (in the 11th row).

By performing the above-mentioned data deletion process, each deletion unit 165 identifies the entry storage unit 130 where the data to be deleted is registered, without having to search other entry storage units 130 and the like, since each registered data is associated with identification information of an entry storage unit 130 in which the data is registered. Also, the information processing apparatus 100 allows the multiple deletion units 165 to perform data deletion processes on the multiple entry storage units 130 in a distributed manner. This reduces the possibility that a competition may occur.

FIG. 6 shows an example of code in accordance with which the information processing apparatus 100 according to this embodiment performs a domain addition process. If any registration unit 145 cannot detect an entry storage unit 130 having an empty entry in the data registration process shown in FIG. 4, the registration unit 145 performs a domain addition process. Alternatively or in addition thereto, if the registration unit 145 determines that the number of empty entries has become equal to or less than a predetermined reference value, it may perform a domain addition process before receiving a data registration process.

First, the registration unit 145 adds a variable step to the variable D of the control information storage unit 135 so as to calculate a new largest domain number new_d (in the 2nd row). The variable step may be identical to the variable step shown in FIG. 4 or may be different therefrom. Also, the variable step may have the same value as that of the parallel degree S.

Subsequently, the registration unit 145 atomically updates the value of the variable I to the value of the new largest domain number new_d (in the 3rd row). This prevents a competition between the domain addition process performed by the registration unit 145 and those performed by other registration units 145 or the like.

If the new largest domain number exceeds the number of elements of the array H that are in use or prepared (if the condition is met in the 4th row), there occur shortages of spare entry storage units 130. For this reason, the registration unit 145 generates new multiple entry storage units 130 larger in number than the current entry storage units 130 by allocating a new array H including elements larger in number than those of the current array H (in the 6th row). Subsequently, the registration unit 145 copies the contents of the original multiple entry storage units 130 to the generated new multiple entry storage units 130 (in the 7th to 8th rows). In this embodiment, the registration unit 145 doubles the number of elements of the array H (in the 6th and 9th rows). In contrast, if the new largest domain number is less than the number of elements of the array H that are in use or prepared (the condition is unmet in the 4th row), the registration unit 145 does not need to expand the array H.

The registration unit 145 generates new entry storage units 130, registers pointers to the new entry storage units 130 in spare elements of the array H (in the 12th row), and increases the number of entry storage units 130 to the new largest domain number new_d (in the 11th row). Subsequently, the registration unit 145 updates the variable D to the largest domain number new_d. Thus, the registration unit 145 adds one or more spare entry storage units 130 to the multiple entry storage units 130 in use so that pointers to pieces of data to be registered are registered in the added entry storage units 130.

By performing the above-mentioned domain addition process, the information processing apparatus 100 is allowed to add new entry storage units 130 if there occur shortages of entry storage units 130. This prevents the shared data from initially occupying a large storage area. Also, if the array H includes spare elements, the information processing apparatus 100 is allowed to register pointers to the new entry storage units 130 in the spare elements. As a result, an overhead for expanding the array H is avoided.

Figure 7:
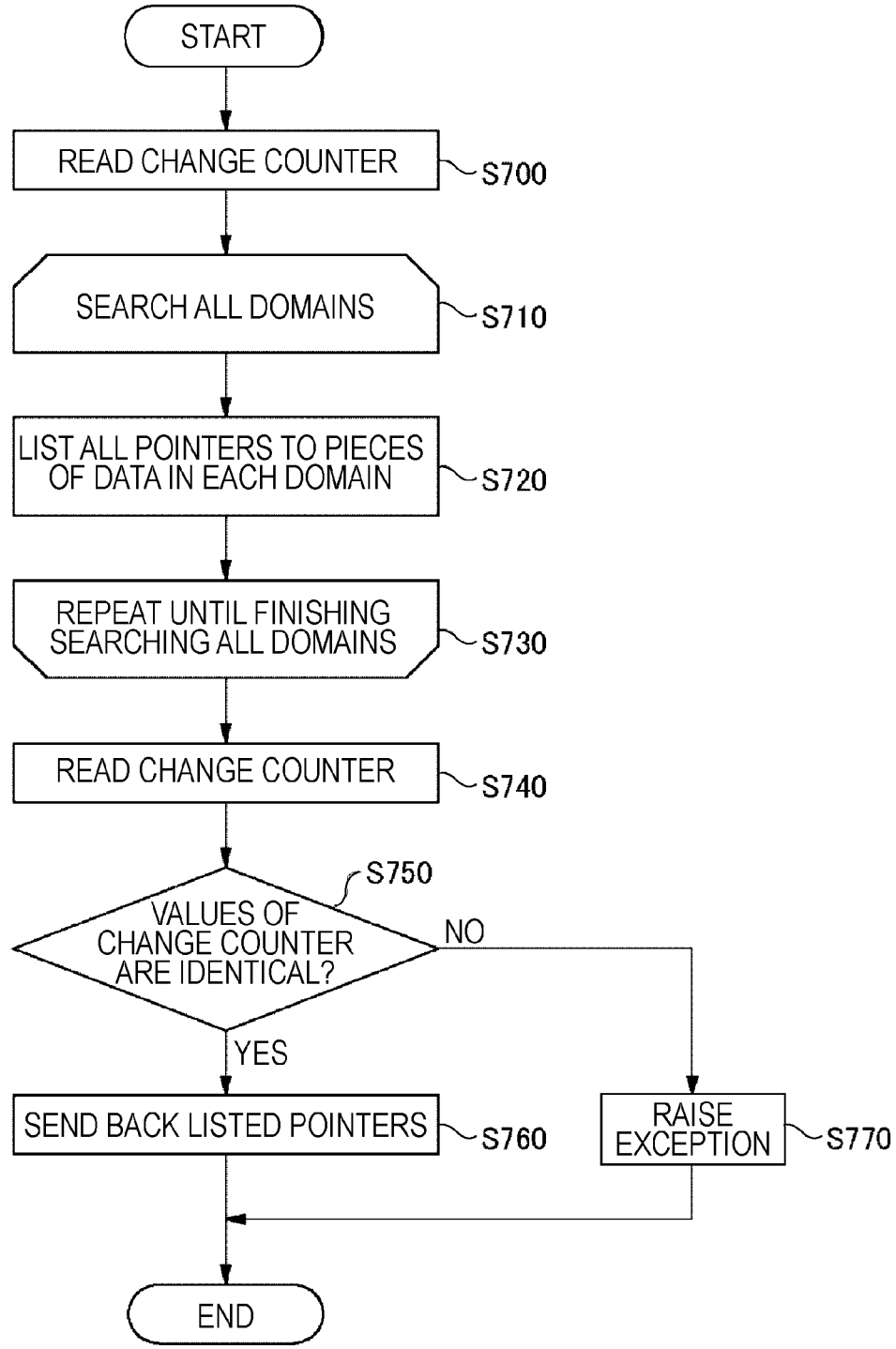
FIG. 7 shows the flow of a data listing process performed by the information processing apparatus according to this embodiment.

FIG. 7 shows the flow of a data listing process performed by the information processing apparatus 100 according to this embodiment. One listing unit 155 reads out the variable C of the control information storage unit 135 so as to acquire the value of a change counter at a time before performing a listing process (S700). While the description of an update of the value of the change counter has been omitted in the description of the data registration process shown in FIG. 4 and the data deletion process shown in FIG. 5, each registration unit 145 or deletion unit 165 may update (e.g., increment) the value of the change counter when registering or deleting data.

The listing unit 155 acquires pointers to entry storage units 130 in use from elements corresponding to indexes from 0 to the value of the variable D in the array H and then searches all the entry storage units 130 (S710, S730). In each domain, the listing unit 155 refers to the array F and lists all pointers to pieces of data (S720).

If the listing unit 155 finishes listing all pieces of registered data, it reads the change counter again (S740). If the value of the change counter is identical to the value read out in S700, the listing unit 155 determines that there has occurred no data registration or data deletion during the listing and then sends back the listed pointers to the program running on the processing units 140 (S760). In contrast, if the value of the change counter is different from the value read out in S700, the listing unit 155 determines that there has occurred data registration or data deletion during the listing and then raises an exception (S770). One processing unit 140 that has received the exception may perform a process to be performed in a case where data listing fails, or may retry data listing.

By performing the above-mentioned data listing process, the information processing apparatus 100 is allowed to send back pointers to pieces of data listed during a period when there has occurred no data registration or data deletion. As a result, the information processing apparatus 100 avoids inconsistencies between processes.

Figure 8:
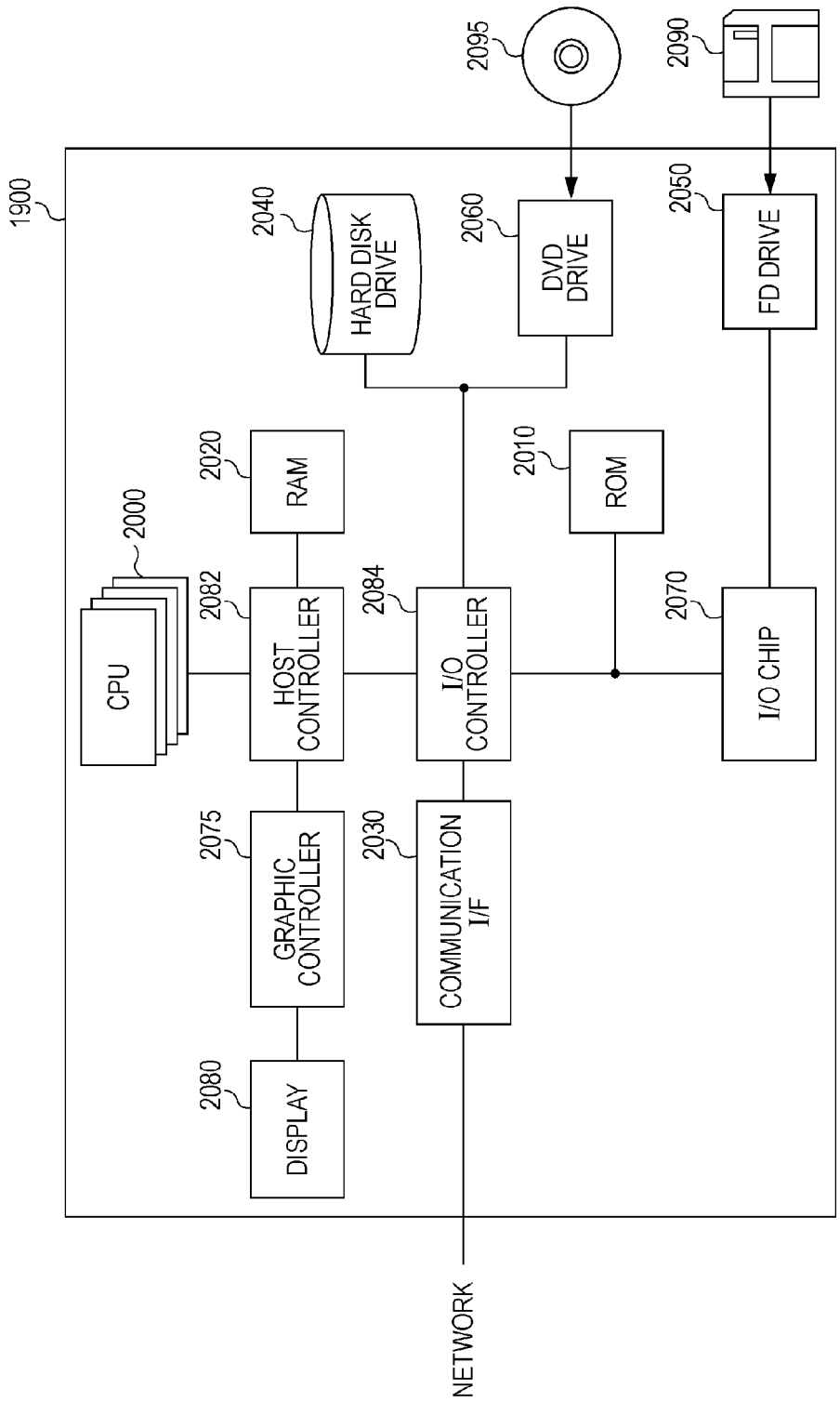
FIG. 8 shows an example hardware configuration of a computer according to this embodiment.

FIG. 8 shows an example hardware configuration of a computer 1900 according to this embodiment. The computer 1900 according to this embodiment includes a CPU peripheral unit, an input/output unit, and a legacy input/output unit. The CPU peripheral unit includes a CPU 2000, a RAM 2020, a graphic controller 2075, and a display 2080, which are coupled to one another via a host controller 2082. The input/output unit includes a communication interface 2030, a hard disk drive 2040, and a CD-ROM drive 2060, which are coupled to the host controller 2082 via an input/output controller 2084. The legacy input/output unit includes a ROM 2010, a flexible disk drive 2050, and an input/output chip 2070, which are coupled to the input/output controller 2084.

The host controller 2082 couples between the RAM 2020, and the CPU 2000 configured to access the RAM 2020 at a high transfer rate and the graphic controller 2075. The CPU 2000 operates on the basis of programs stored in the ROM 2010 and RAM 2020 so as to control each component. The graphic controller 2075 acquires image data generated by the CPU 2000 or the like on a frame buffer provided in the RAM 2020 and displays the acquired image data on a display unit 2080. Alternatively, the graphic controller 2075 may include a frame buffer for storing image data generated by the CPU 2000 or the like.

The input/output controller 2084 couples between the host controller 2082, and the communication interface 2030, which is a relatively high-speed input/output device, hard disk drive 2040, and CD-ROM drive 2060. The communication interface 2030 is coupled to other apparatuses via a network. The hard disk drive 2040 stores a program and data to be used by the CPU 2000 of the computer 1900. The CD-ROM drive 2060 reads out a program or data from the CD-ROM 2095 and provides the read-out program or data to the hard disk drive 2040 via the RAM 2020.

Also coupled to the input/output controller 2084 are the ROM 2010 and relatively low-speed input/output devices, such as the flexible disk drive 2050 and the input/output chip 2070. The ROM 2010 stores a boot program to be executed at a boot of the computer 1900, a program dependent on the hardware of the computer 1900, and the like. The flexible disk drive 2050 reads out a program or data from the flexible disk 2090 and provides the read-out program or data to the hard disk drive 2040 via the RAM 2020. The input/output chip 2070 couples the flexible drive 2050 to the input/output controller 2084, as well as couples various input/output devices to the input/output controller 2084, for example, via a parallel port, a serial port, a keyboard port, a mouse port, and the like.

For example, a program stored in a recoding medium such as the flexible disk 2090, the CD-ROM 2095, or an integrated circuit (IC) card is installed into the hard disk drive 2040 via the RAM 2020 by the user and then executed by the CPU 2000.

A program installed into the computer 1900 and intended to cause the computer 1900 to function as the information processing apparatus 100 includes a data storage control module for controlling the data storage unit 120, an entry storage control module for controlling the entry storage units 130, a control information storage module for controlling the control information storage unit 135, and a processing module including a registration module, a listing module, and/or a deletion module. This program or these modules operates the CPU 2000 and the like in order to cause the computer 1900 to function as the data storage unit 120, entry storage units 130, control information storage unit 135, and processing units 140 including the registration units 145, listing units 155, and/or and deletion units 165.

In other words, when information written in this program is read by the computer 1900, the data storage unit 120, entry storage units 130, control information storage unit 135, and processing units 140 each including the registration unit 145, listing unit 155, and/or and deletion unit 165 are realized as specific means in which software and the above-mentioned various hardware resources collaborate with each other. Also, by performing operations on information or processing information using these specific means in accordance with the use objective of the computer 1900 according to this embodiment, a unique information processing apparatus 100 according to the use objective is constructed.

For example, if communications are performed between the computer 1900 and an external apparatus or the like, the CPU 2000 executes a communication program loaded in the RAM 2020 and, on the basis of a process written in the communication program, instructs the communication interface 2030 to perform a communication process. Under the control of the CPU 2000, the communication interface 2030 reads out transmission data stored in a transmission buffer area or the like provided in a storage device such as the RAM 2020, hard disk drive 2040, flexible disk 2090, or DVD 2095 and transmits the read-out transmission data to a network, or writes reception data received via a network into a reception buffer area or the like provided in a storage device. As described above, the communication interface 2030 may transmit transmission data to a storage device or receive reception data from a storage device using the DMA (direct memory access) method. Alternatively, the CPU 2000 may read out data from a storage device or the communication interface 2030, which is the transmission source, and may write the read-out data into the communication interface 2030 or a storage device, which is the transmission destination, so as to transfer transmission data or reception data.

Also, the CPU 2000 loads all or necessary ones of files, databases, and the like stored in an external storage device such as the hard disk drive 2040, DVD drive 2060 (DVD 2095), or flexible disk drive 2050 (flexible disk 2090) into the RAM 2020 using DMA transfer or the like and performs various processes on the data loaded in the RAM 2020. Then, the CPU 2000 writes the resultant data back into the external storage device using DMA transfer or the like. In such a process, the RAM 2020 is considered as an apparatus for temporarily retaining the data stored in the external storage device. Therefore, in this embodiment, the RAM 2020, external storage devices, and the like are each referred to as a "memory," a "storage unit," a "storage device," or the like. In this embodiment, various programs and various types of information such as data, tables, and databases are stored in such storage devices and are subjected to information processing. Incidentally, the CPU 2000 may read or write data from or into a cache memory retaining a part of the RAM 2020. In this case, the cache memory also plays a part of the function of the RAM 2020. Therefore, in this embodiment, it is assumed that the cache memory is included in the "RAM 2020," a "memory," or a "storage device," except for a case where the cache memory and RAM 2020 or the like are shown independently.

Also, the CPU 2000 performs various processes that are specified by command strings in a program and include various operations, information processing, condition judgment, and retrieval or replacement of information described in this embodiment, on data read out from the RAM 2020 and then writes the resultant data back into the RAM 2020. For example, if the CPU 2000 performs condition judgment, it judges whether each variable shown in this embodiment meet a condition such as a condition that the variable must be larger, smaller, equal to or larger than, equal to or smaller than, or equal to other variables or constants. If the condition is met (or unmet), the condition judgment is branched to a different command string or a sub-routine is called.

Also, the CPU 2000 is allowed to retrieve information included in a file, a database, or the like stored in a storage device. For example, if multiple entries in which the attribute value of a first attribute and that of a second attribute are associated with each other are stored in a storage device, the CPU 2000 retrieves an entry in which the attribute value of the first attribute meets a specified condition, from among the multiple entries and reads out the attribute value of the second attribute stored in the entry. Thus, the CPU 2000 obtains the attribute value of the second attribute associated with the first attribute meeting the specified condition.

The above-mentioned program or modules may be stored in an external recording medium. Among such recording media are the flexible disk 2090 and DVD 2095 as well as optical recording media such as a digital versatile disc (DVD) and a compact disc (CD), magneto-optical recording media such as a magneto-optical (MO) disk, tape media, and semiconductor memories such as an IC card. Also, a storage device, such as a hard disk or a random access memory (RAM), provided in a server system connected to a dedicated communication network or the Internet may be used as a recording medium and the above-mentioned program stored in such a storage device may be provided to the computer 1900 via a network.

While the present invention has been described using the embodiment thereof, the technical scope of the invention is not limited to the description of the embodiment. It will be apparent for those skilled in the art that various changes and modifications can be made to the above-mentioned embodiment. Also, it will be apparent from the description of the appended claims that such changed or modified embodiments can also fall within the technical scope of the invention.

Also, it should be noted that there is no specific description such as "perform an operation before performing another operation" about the order of performance of the processes, such as operations, steps, and stages, of the apparatus(es), system(s), program(s), and/or method(s) described in the appended claims, specification, and accompanying drawings and that these processes may be performed in any order unless an output produced in a preceding process is used in a subsequent process. While the flow of the operations is described using terms such as "first," "then," and the like in the claims, specification, and drawings for convenience sake, such terms do not mean that the operations always must be performed in that order.

What is claimed is:

1. A control apparatus for controlling data, the apparatus comprising:
   a data storage unit for storing data;
   a plurality of entry storage units, wherein each of the entry storage units stores an entry for registering a pointer to data; and
   a plurality of registration units, each of the registration units configured to, based on receiving an instruction for registering data, (i) search the entry storage units for an entry storage unit having an empty entry, (ii) register a pointer to the data to be registered in the entry storage unit having the empty entry, and (iii) store both the data to be registered and an identification information of the entry storage unit having the empty entry in the data storage unit in such a manner that the data to be registered and the identification information are associated with each other.

2. The control apparatus according to claim 1, further comprising:
   a plurality of deletion units, each of the deletion units configured to, based on receiving an instruction for deleting registered data, (i) acquire identification information associated with the data to be deleted from the data storage unit and (ii) delete a pointer to the data to be deleted from an entry storage unit among the entry storage units, wherein the entry storage unit is specified by the identification information associated with the data to be deleted.

3. The control apparatus according to claim 1, wherein the plurality of registration units is configured such that each registration unit searches the entry storage units in an order different from orders in which the other registration units search the entry storage units, based on two or more of the registration units receiving the instruction for registering data.

4. The control apparatus according to claim 1, wherein the plurality of registration units is configured such that each registration unit searches the entry storage units, based on two or more of the registration units receiving the instruction for registering data, in an order calculated from unique information unique to the registration unit.

5. The control apparatus according to claim 4, wherein the two or more registration units acquire a value that varies each time the value is read and generate the unique information from the acquired value.

6. The control apparatus according to claim 1, wherein the plurality of registration units is configured such that each registration unit searches for an entry storage unit having an empty entry within a set of at least two or more entry storage units different from sets of at least two or more entry storage units searched by the other registration units among the entry storage units based on two or more of the registration units receiving the instruction for registering data.

7. The control apparatus according to claim 1, wherein the plurality of registration units is configured such that, each registration unit searches a set of at least two or more entry storage units for an entry storage unit having an empty entry, wherein the set of at least two or more entry storage units is determined from information unique to the registration unit, based on two or more of the registration units receiving the instruction for registering data.

8. The control apparatus according to claim 1, wherein the plurality of registration units is configured such that each registration unit searches, based on two or more of the registration units receiving the instruction for registering data, a set of at least two or more entry storage units for an entry storage unit having an empty entry and the at least two or more entry storage units have a quotient or a remainder obtained by dividing a value of identification information of the entry storage unit by a number of the entry storage units and the quotient or the remainder agrees with a quotient or a remainder obtained by dividing information unique to the registration unit by the number of the entry storage units.

9. The control apparatus according to claim 2, wherein the entry storage units each store an array of a plurality of the entries and identification information for identifying a top unregistered entry and, each registration unit atomically updates the identification information of the top unregistered entry, based on each of the registration units receiving an instruction for registering data.

10. The control apparatus according to claim 9, wherein the entry storage units store a list of unused entries and each deletion unit deletes, based on each of the deletion units receiving an instruction for deleting registered data, the data from the array and atomically adds an entry included in the array to the list of unused entries.

11. The control apparatus according to claim 1, further comprising:
a control information storage unit for storing control information for controlling the plurality of entry storage units and a spare entry storage unit, wherein each registration unit is configured to add the spare entry storage unit to the plurality of entry storage units and register a pointer to data to be registered in the added entry storage unit, based on each of the registration units being unable to detect an entry storage unit having an empty entry.

12. The control apparatus according to claim 1, wherein each registration unit is configured to generate a plurality of new entry storage units larger in number than the entry storage units and copy contents of the original entry storage units to the new entry storage units, based on each of the registration units being unable to detect an entry storage unit having an empty entry.

13. The control apparatus according to claim 1, further comprising:
a listing unit for listing a pointer to each data obtained by searching the plurality of entry storage units and for raising an exception if registration or deletion of data occurs during the listing.

14. A control apparatus for controlling data, the apparatus comprising: a data storage unit for storing data; a plurality of entry storage units, wherein each entry storage unit includes an entry for registering data; and a plurality of registration units configured to, based on receiving an instruction for registering data, (i) search the entry storage units in an order different from orders in which the other registration units search the entry storage units, (ii) register data in one of the entry storage units, the one entry storage unit having an empty entry, and (iii) store the data to be registered in the data storage unit.

15. The control apparatus according to claim 14, wherein the plurality of registration units is configured such that each registration unit searches a set of at least two or more entry storage units different from sets of at least two or more entry storage units searched by the other registration units among the entry storage units for an entry storage unit having an empty entry, based on each of the registration units receiving an instruction for registering data.

16. A control method for controlling data using a computer device, the method comprising: storing the data in a data storage unit; storing an entry for registering a pointer to data using a plurality of entry storage units; and searching, by a plurality of registration units, the entry storage units for an entry storage unit having an empty entry based on receiving, by the plurality of registration units, an instruction for registering data; registering a pointer to the data to be registered in the entry storage unit having the empty entry; and storing the data to be registered and identification information of the entry storage unit having the empty entry in the data storage unit in such a manner that the data to be registered and the identification information of the entry storage unit having the empty entry are associated with each other.

17. A non-transitory computer readable article of manufacture tangibly embodying computer readable instructions which when executed cause a computer to carry out the steps of the method for controlling data according to claim 16.

* * * * *